Dec. 8, 1964 G. ZIEGLER ETAL 3,160,521
METHOD FOR PRODUCING MONOCRYSTALLINE LAYERS OF SEMICONDUCTOR MATERIAL
Filed Nov. 29, 1961
Fig.1
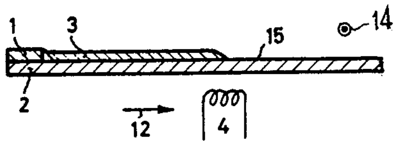
Fig.3
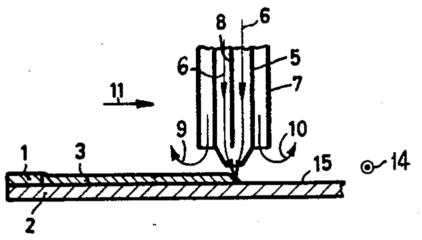
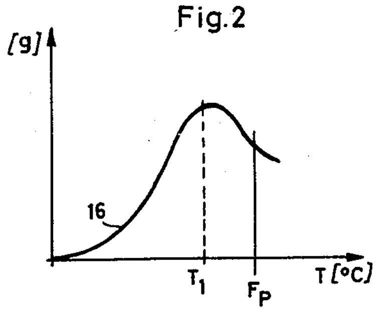
Fig.2
Fig.4
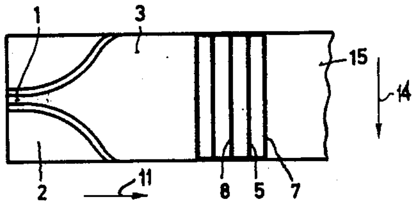
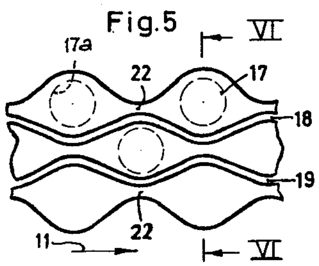
Fig.5
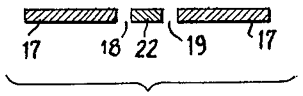
Fiq.6
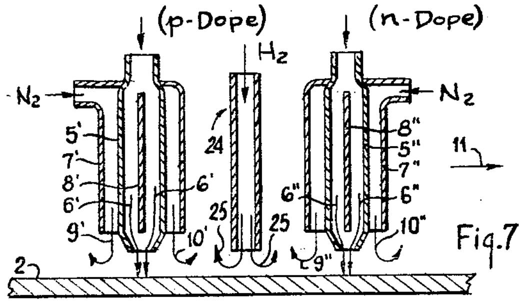
Fiq.7

United States Patent Office 3,160,521

Patented Dec. 8, 1964

3,160,521

METHOD FOR PRODUCING MONOCRYSTALLINE LAYERS OF SEMICONDUCTOR MATERIAL

Günther Ziegler, Erlangen, and Erhard Sirtl, Munich, Germany, assignors to Siemens & Halske Aktiengesellschaft, Munich, Germany, a corporation of Germany Filed Nov. 29, 1961, Ser. No. 155,691
Claims priority, application Germany, Nov. 30, 1960, S 71,476
16 Claims. (Cl. 117—213)

Our invention relates to a method for the production of monocrystalline, particularly thin, semiconducting layers by thermal dissociation of a gaseous compound of the semiconductor substance and precipitation of the semiconductor substance onto a plate-shaped carrier.

It is known to produce monocrystalline layers of semiconductor substance by growing the substance from a gaseous phase onto a carrier of the same material. According to the method heretofore employed, the carrier is heated in an atmosphere containing the gaseous compound to be dissociated, so that the semiconductor substance is deposited and grown on the entire free surface of the carrier.

According to the method of our invention, we attach, to the carrier used for such a pyrolytic production method, a crystal seed which is oriented so that the rate of growth in the direction of the major extent of the carrier surface (length) is much greater than perpendicularly thereto (width), and we confine the dissociation of the gaseous semiconductor compound and the precipitation of the semiconductor substance upon the carrier to a narrower zone which, commencing at the crystal seed, is passed along the carrier. The width, of this travelling reaction and precipitation zone, is preferably in the order of 1 to 2 millimeters.

The method according to our invention affords a planned precipitation of semiconductor substance upon selected portions of the carrier surface. It has the further considerable advantage that the precipitated layer of semiconductor substance grows independently of the crystalline lattice structure of the carrier because the crystal does not grow as an extension of the carrier lattice but attaches itself in monocrystalline constitution to the crystal seed located on the carrier and, starting from the seed, spreads over a wider area of growth.

According to another preferred feature of our invention, therefore, the carrier employed in the above-described method consists of a material whose lattice structure differs from that of the semiconductor substance, consisting for example of quartz, ceramic or a metal, e.g., tantalum.

According to a further feature of our invention, it is preferable to maintain, in the narrow zone in which the dissociation and precipitation take place, a temperature gradient that extends at a slant to the surface area of the carrier, the angle of slant being such that the rate of growth is largest at the surface of the semiconductor layer being precipitated. As a result, disturbances in growth originating from points of the precipitated layer located at the surface of the underlying carrier are largely prevented.

When the semiconductor material is precipitated at the upper side of the carrier, the heating of the carrier is preferably effected from below as illustrated in the drawings. The heating of the carrier must then take the thickness of the carrier into account and must be adjusted to such an intensity that in the heating zone at the upper side of the carrier a precipitation of the semiconductor material from the reaction gas is possible. It is further desirable that the rate of precipitation has its highest value not directly at the carrier surface but at some distance therefrom. If the heating of the carrier is effected from below, then the temperature will be greater at the carrier surface than at some distance therefrom so that there will result a temperature gradient directed perpendicularly to the carrier surface.

For further explaining the invention, reference will be made to a few particularly favorable embodiments illustrated by way of example on the accompanying drawings, in which:

FIG. 1 is a side view of one embodiment of our invention;

FIG. 2 is a precipitation curve;

FIG. 3 is a side view of another embodiment of our invention;

FIG. 4 is a plan view of FIG. 3;

FIG. 5 is a plan view of another embodiment of our invention;

FIG. 6 is a sectional view of FIG. 5 along line VI—VI;

FIG. 7 is a side view of still another embodiment of our invention.

Shown in FIG. 1 is a plate-shaped carrier 2, consisting for example of quartz, on whose surface area 15 a monocrystal seed 1 is arranged. The monocrystal seed 1 is so oriented that the crystal-growing rate in the direction indicated by the arrow 12 is much greater than perpendicular to this direction 14. That is, for crystals with diamond lattice (SiGe) the crystal plane of the seed extending in the surface plane 15 of the carrier is the (111)-plane, and the crystal plane extending in the direction of growth and hence perpendicular to the surface 15 is the (112)-plane. The carrier 2 may have a width of a few cm., e.g., 2 cm. The thickness is preferably 0.3 to 0.5 mm. for a carrier of quartz; the silicon layer precipitated on the carrier has a thickness of $10^{-2}$ to $5 \cdot 10^{-1}$ mm., e.g., 0.1 mm.

According to another embodiment of the invention, the crystal seed does not extend from one narrow edge of the carrier to the other but is shaped as a small plate which is arranged on one side of the surface 15 of the carrier approximately in the middle thereof (FIG. 4).

The carrier 25 with the seed crystal 1 is placed into an atmosphere that contains a gaseous compound of the semiconductor material, for example silicon, to be decomposed and precipitated. This gaseous compound consists, for example, of a halogen or hydrogen compound of silicon (such as $SiCl_4$, $SiH_2Cl_2$, $SiI_4$, $SiH_4$) or germanium (such as $GeCl_4$, $GeH_2Cl_2$, $GeI_4$, $GeH_4$) or one or more gaseous compounds from the III and V groups of the periodic system (such as InSb, InAs, GaAs). To produce for example GaAs, a gaseous mixture of $GaCl_3$, $H_2$ and As may be used. The carrier 2 is kept at a temperature sufficiently below the pyrolytic precipitation temperature so that no precipitation will take place, e.g., approximately 850° C. for silicon. By means of a heating device, for example an infrared radiator 4, which extends perpendicular into the plane of the drawing, that is transversely across carrier 15, particularly from one end of the carrier to the other, a narrow zone of the carrier is heated up to the pyolytic dissociation temperature so that the semiconductor substance is caused to precipitate only in this narrow high-temperature zone. Starting from the crystal seed 1, the infrared radiator is moved along the carrier in the direction of the arrow 12. The monocrystalline growth spreads, starting from the seed crystal, over a wider area (see FIG. 4). For heating the narrow zone, the carrier can be kept stationary and the heater moved along the carrier, or the carrier can be passed over a stationary heater device. The travelling speed of the high-temperature zone is determined essentially by the heating-up rate of the carrier required for increasing its temperature from its normal value (850° C.) to the dissociation temperature (for example 1200° C.) by means of the heater.

In cases where the carrier consists of a suitable material such as tantalum, a high-frequency coil can be used for heating instead of an infrared radiator. The heating of the narrow zone, however, can also be effected by means of an electric gas discharge between the carrier and an electrode which is passed along the surface 15 of the carrier.

The operation of the heater device causes a temperature gradient to be maintained in the carrier. This gradient is preferably so chosen that the temperature, at the surface 15 of the carrier within the narrow high-temperature zone, is that at which maximum precipitation takes place. FIG. 2, for example, indicates the precipitation curve 16 for silicon from a given $SiCl_4/H_2$ mixture. The ordinate indicates the precipitated quantity of silicon in grams, and the abscissa indicates the temperature T in centigrades. As indicated in the graph of FIG. 2, the pyrolytic precipitation takes place at a maximum rate at a given temperature $T_1$. Somewhat below the melting point, $F_p$ of the semiconductor, e.g., for silicon, $F_p$ is 1420° C. If the temperature at the precipitation surface of the carrier is so adjusted that it is less than $T_1$, then the precipitation will decrease with increasing distance from the carrier surface because of the above-mentioned temperature gradient at the carrier surface, with the result that the above-mentioned optimal adjustment of the rate of precipitation is not realized. However, if the temperature of the carrier is adjusted to a higher value than $T_1$, then the temperature $T_1$ is obtained at some distance from the carrier surface so that the rate of pyrolytic dissociation and precipitation, starting from the carrier surface, first increases and then commences to decrease only at some distance from that surface. Consequently with such a choice of the temperature at the carrier surface, the desired optimal conditions are realized.

In any given individual case, therefore, it is advisable to obtain information as to the value of the temperature $T_1$ at which the maximal precipitation from a given reaction gas takes place. That such a temperature exists in any event, is reliably known on the basis of experimental knowledge as well as one the basis of thermodynamic computation. An experimental determination of the temperature $T_1$ therefore is always applicable in those cases in which this temperature is not previously known.

For determining the temperature $T_1$ of the maximal rate of precipitation, several carriers of known weight are heated to respectively different temperature and subjected to a reaction gas flow. For this purpose, it is advisable to pass reaction gas of known composition through a distributor pipe simultaneously into several parallel connected chambers, each of which contains a carrier body of known weight consisting for example of silicon. The carriers are uniformly heated to different temperatures for example spaced 50 or 100° C. from each other. After a few hours, the supply or reaction gas is terminated and the quantity of precipitated semiconductor material on each carrier is determined and calculated per unit of area of the surface of the particular carrier. The semiconductor quantity per unit of area thus obtained is plotted in a diagram as abscissa over the appertaining carrier temperature. The point thus obtained is located on a curve of the type illustrated in FIG. 2. When the measured points are sufficiently close, the value of the temperature $T_1$ can readily be determined from the course of the curve with any desired accuracy. When the temperature at the upper side of the carrier in the heated zone is so chosen that, with heating from below, it assumes a temperature value greater than the above-mentioned temperature $T_1$, then the precipitation condition obtaining at the carrier surface is less favorable than those obtaining at a distance, for example, of 1 or 2 mm. away from this carrier surface. As a result, the precipitation of silicon is preferably determined by the (211)-orientation of the crystal seed so, that in the formation of the monocrystalline layer, the effect of the carrier surface upon the crystal structure of the precipitated semiconductor material is suppressed to a high degree, and this surface, therefore, can produce virtually no disturbance upon the monocrystalline growth imposed by the crystal seed upon the semiconductor material precipitated from the gaseous phase.

For example, when using a reaction gas of dry hydrogen with an admixture of 5 volume percent $SiCl_4$ or 10 volume percent $SiHCl_3$, then the carrier topside upon which the precipitation is effected, can be heated up to a temperature of 1200 to 1250° C., because the maximum of precipitation from such a reaction gas is at about 1100 to 1150° C. ($T_1$).

Investigations and calculations concerning the preferred growth of silicon and germanium crystals have shown that with twin planes oriented in the (112)-direction and with an orientation in (111)-planes a particularly rapid layer growth of the crystal from a melt as well as from the gas phase in the (112)-plane is afforded (dendritic growth). This fact can be utilized in a method according to the invention by employing as crystal seed a dendritic tape of the just-mentioned orientation.

FIG. 3 illustrates another, preferred embodiment of the invention. The carrier plate 2, consisting for example of quartz, and carrying the monocrystalline seed 1 is heated at its surface 15 to a temperature at which the precipitation of the semiconductor material takes place. For forming the monocrystalline layer 3, the gaseous compound to be dissociated is passed against the carrier surface by means of a blade or slit-shaped nozzle, while the nozzle structure is being moved along the carrier 2 in the direction of the arrow 11, starting from the crystal seed 1. The nozzle structure preferably consists of quartz. It may also be made of boron nitride or high-purity ceramics.

By means of this precipitation nozzle, and starting from a narrow monocrystal 1, a monocrystalline layer 3 is grown which, due to the above-mentioned orientation of the crystal seed, spreads on the surface 15 of the carrier with a preferred direction of growth. The nozzle 5 is surrounded by a jacket through which an inert gas, for example nitrogen, which gas is supplied in the direction of the arrows 9 and 10, cools the adjacent surface and prevents growth disturbances at the locations of lower temperature. The jacket 7 may also consist of quartz and may be fused together with the body of the nozzle 5 proper. The gas to be dissociated flows in the direction of the arrows 6 through two chambers on both sides respectively of a partition 8 in the nozzle 5.

FIG. 4 shows the carrier seen from above. It will be recognized how the semiconductor layer 3, starting from the narrow seed crystal 1, widens in fan shape and during continued growth covers substantially the entire width of the carrier surface.

The method described above with reference to FIG. 3 can be modified, using a heater device as described in conjunction with FIG. 1 for heating the narrow zone of the carrier located beneath the nozzle, while maintaining the other portions of the carrier surface at a temperature below the dissociation temperature. The heater device is then moved in the direction of the arrow 11 at the same speed as the nozzle and also starting from the seed crystal, analogous to the above-described method with reference to FIG. 1.

The method according to the invention can also be employed by precipitating a doped semiconductor layer by adding doping substances to the reaction gas mixture. However, the doping substance can also be diffused into the semiconductor layer from the material of the carrier into the layer while the semiconductor layer is being precipitated. By doping the gaseous atmosphere with a doping substance that produces the opposite type of conductance, the immediate formation of p-n junctions is afforded because the doping, by diffusion of lattice defects from the carrier into the semiconductor layer, takes place only at the layer zone immediately adjacent to the carrier. A p-n junction can also be produced by subsequently diffusing a corresponding doping substance into the semiconductor layer, or opposingly doped layers can be precipitated upon each other.

As stated above, the doping substance can be diffused into the semiconductor from a solid body which is in contact with the semiconductor. According to our invention, this is done mainly by having doping substance diffuse from a correspondingly prepared carrier into the precipitated monocrystalline semiconductor layer.

When, for example, a carrier of quartz is used, the carrier can be precharged with boron by tempering in a boron-containing atmosphere, for example in $B_2O_3$ vapor or $BCl_3$ vapor. When the processing temperature, the processing time, and the content of the boron-containing atmosphere used for precharging a second group of the quartz carriers are adjusted to the same values, which were used to precharge a first group of quartz carriers of the same constitution, then boron content of both groups of quartz carriers will assume the same value. When, thereafter, elemental silicon is precipitated according to the invention upon a carrier thus prepared, boron diffuses from the carrier into the precipitated silicon during the precipitation process. The diffusion can be augmented by subsequently subjecting the precipitated silicon to tempering. By using carrier bodies prepared in the same manner, using the same precipitation temperatures and the same precipitation periods of time and performing a subsequent treatment in the same manner, the doping degree of the resulting silicon layers can be kept uniform. It is advisable to use one of the produced silicon layers of a group or batch for performing pretests in order to definitely ascertain the processing temperatures and processing periods required for obtaining a given degree of doping.

*Example*

The carriers consisting of quartz are tempered at about 800° C. in an atmosphere of $B_2O_3$ vapor under a pressure of 1 mm. Hg. The borated carriers are thereafter used for precipitating thereupon a layer of silicon from a reaction gas consisting of about 5 percent $SiHCl_3$ by volume and 95 percent hydrogen by volume, the reaction gas issuing from a slit nozzle of about 1.1 mm. width of the slit-like nozzle orifice at a rate of 0.1 liter per minute. The temperature of the heated zone is adjusted to a surface temperature of about 1200° C. at the carrier. The travel speed in the heating zone is approximately 3 mm. per minute. The thickness of the precipitated silicon layer in this case is approximately 0.05 or $5 \cdot 10^{-2}$ mm. By subsequently tempering the carrier with the precipitated silicon layer for about 10 hours, a boron concentration in the precipitated silicon of approximately 1 boron atom per $10^8$ silicon atoms is obtained.

A particularly favorable method of precipitating opposingly or differently doped layers is shown in FIG. 7, and consists in passing a plurality of knife-edge or slit-like type nozzles beside each other along the carrier. If the reaction gas mixture issuing from two adjacent nozzles contains doping substances or gaseous compounds thereof, which produce respectively different conductance types, then successive n-type and p-type doped layers can be precipitated in this manner. In FIG. 7 slit-like nozzles 5' and 5'' are constructed in the same manner as nozzle 5 of FIG. 3. While nozzles 5' and 5'' are shown to the respectively issue p-doped and n-doped reaction mixture, the arrangement can be reversed to produce successive n-type and p-type doped layers. Hydrogen issues from slit-like nozzle 24 as indicated by arrows 25, and serves the purpose of preventing accidental mixing of p-doped and n-doped reaction gases as they issue respectively from nozzles 5' and 5''. Nozzle 24 and the hydrogen supply can be omitted, if desired, as nitrogen stream 10' and 9'' issuing respectively from nozzles 5' and 5'' serve, to some extent, the same purpose.

As a rule, the reaction gas is given an admixture of pure hydrogen from the outset because hydrogen, by its reducing action, greatly promotes the precipitation of the semiconductor substance. However, it is also possible, as stated above, to employ a carrier from which hydrogen will evolve during the operation. For example, a carrier of tantalum has the property to absorb hydrogen in considerable quantity at moderate temperatures and to again issue the hydrogen under great heat. The liberated hydrogen is characterized by a particularly high reducing action. If one employs a reaction gas which at the carrier temperatures used in the method of the invention would not precipitate silicon in the heated zone in the absence of hydrogen, but which would be capable of such precipitation in the presence of hydrogen (for example $SiCl_4$), then the quantity of the silicon being precipitated is controlled by the quantity of the hydrogen being liberated out of the carrier material so that the thickness of the precipitated silicon layer is determined by the hydrogen content of the carrier. The quantity of the hydrogen thus supplied depends not only on the hydrogen quantity used for hydrating the carrier sheet but also upon the thickness of the already precipitated semiconductor layer because the diffusion of the hydrogen must take place through this layer. The hydrated tantalum sheet to be used as carrier can, if desired, be pretreated, for example with boron in the same manner as quartz was treated above, causing the pyrolytic precipitation to result immediately in the production of a highly doped semiconductor layer.

In order to prevent cracking of the semiconductor layer due to contraction during cooling, it is advantageous in some cases to make the carrier of a material whose thermal coefficient of expansion is substantially equal to that of the semiconductor material. For example, when producing monocrystalline layers of germanium according to the method of the invention, the carrier may consist of glass having substantially the same coefficient of thermal expansion.

As a rule, however, a carrier material whose lattice structure differs from that of the precipitated semiconductor material expands thermally at a rate different from that of the precipitated semiconductor layer so that fissures and cracks may occur during cooling. For this reason, and in accordance with another feature of our invention, it is preferable to provide the surface area of the carrier, prior to precipitation of the semiconductor material, with subdividing incisions or cuts. This can be done, for example, by employing an ultrasonic cutter. A plan view and end view of a carrier 17 thus provided with incisions is illustrated in FIGS. 5 and 6 respectively. The carrier plate, consisting for example of quartz, is provided with slits 18, 19 which are cut by means of a saw or the above-mentioned ultrasonic cutter. The cuts are given a wavy shape thus producing narrow carrier portions denoted by 22.

Any fissures, that possibly occur during cooling, are essentially limited to the constricted localities. These, however, are not significant because the carrier is subsequently subdivided at the constricted places for the purpose of producing individual semiconductor components such as the semiconductor discs shown by broken circular lines 17*a* in FIG. 5. There are various other possible techniques for greatly reducing the occurrence of detrimental cracks when using a carrier whose thermal expansion differs from that of the precipitated semiconductor material. One of these other techniques is to subdivide the carrier at high temperature by cutting the semiconductor layer by means of a jet or blast of sand. Fissures can also be prevented by using a very thin and elastic supporting sheet as a carrier, such sheet consisting for example of tantalum, although this has the disadvatage of a lower mechanical stability.

In using a carrier provided with incisions or cuts, the interruption caused by the slit in the otherwise homogeneous surface of the carrier produces an interrupting location for the crystal growth of the silicon or germanium layer being precipitated. Such a slit, therefore, forms a barrier in such a manner that, for example, a partial area of the carrier surface surrounded by circular slit in which a monocrystalline growth of a precipitated silicon layer is produced, constitutes a boundary of the monocrystalline growth along the periphery of this partial area. When the monocrystalline growth commences from a seed located within this partial area and if no such seed is located outside of this partial area, then there will also occur a precipitation of silicon outside of the mentioned partial area when the heated zone passes along such outside zones and reaction gas is present; but the monocrystalline growth is terminated at the just-mentioned barrier.

For example, with a carrier surface according to FIG. 5, the partial area limited by the two gaps 18 and 19 behaves completely independently, with respect to monocrystalline growth, from the growth in the zones of the surface area located outside of these gaps, so that the effect of the gaps 18 and 19 can be compared with the action of a separating wall. For that reason, the growth in the area between the gaps 18 and 19 is decisively influenced by the shape of this area, i.e., the course of the cuts 18 and 19. It is known that dislocations may occur in monocrystalline silicon and that it is possible, under certain conditions, to produce monocrystalline silicon or germanium free of dislocation. The methods known for this purpose, however, deal with the production of dislocation-free silicon or germanium from the molten condition. However, as recognized according to the invention, it is also possible to obtain silicon or germanium from the gaseous phase in a condition free of dislocations or poor of such defects. This is achieved, for example, if the area made available for monocrystalline growth on the carrier surface is locally constricted and again widened as is the case according to FIG. 5 due to the wavy shape of the cuts or gaps 18 and 19.

The method according to our invention results in a formation of a monocrystalline semiconductor layer 3 only upon those parts of the carrier that, during performance of the method, are heated to the pyrolytic dissociation temperature by means of the heating device, or only on those portions of the carrier surface upon which the gaseous compound to be dissociated is directed for example by means of a nozzle. Consequently the method of the invention also affords the production of semiconducting layers which do not cover the entire carrier or whose geometric extent at different parts of the surface is different. This is of advantage particularly in the production of solid-state circuit assemblies in which active components (such as transistors and junction diodes) and passive elements (such as conductors) of an electric circuit or network are contained in or on a carrier consisting for example of a semiconductor such as silicon or germanium, or of ceramic material. The method of the invention is particularly of advantage for the production of such multi-component structures because the production and deposition of the semiconducor constituents is much simpler by our process than with the heretofore employed method of vapor-depositing the different layers upon the carrier, which heretofore vapor-depositing method requires a protective covering to be applied to the semiconductor, ceramic or metallic material of the carrier for each layer produced by the heretofore vapor-depositing method.

The method according to the invention is also favorable in the production of solar batteries or large-area rectifiers as well as for the mass production of other electronic components. For example by subdivision of a carrier provided with p-n junction forming layers, a large number of transistors or diodes can be produced in a single operation. The carrier, if desired, can then also serve as an electric contact or terminal for one of the semiconductor regions.

Obviously many modifications and variations of the present invention are possible in the light of the above teachings. It is therefore to be understood that within the scope of the appended claims, the invention may be practiced otherwise than as specifically described.

We claim:

1. A method for producing monocrystalline, particularly thin, semiconducting layers by thermal decomposition of a gaseous compound of the semiconductor substance and precipitation of the semiconductor substance onto a plate-shaped carrier, which comprises orienting and placing a seed crystal on a plate-shaped carrier, the orientation of said seed crystal being such that the rate of growth in the direction of length is in the (112) plane and the growth in the direction of width is in the (111) plane, dissociating a gaseous semiconducting compound in a narrow zone on said carrier thereby precipitating a semiconducting layer on said carrier in said narrow zone, and passing said zone along said carrier starting from said seed.

2. A method for producing monocrystalline, particularly thin, semiconducting layers by thermal decomposition of a gaseous compound of the semiconductor substance and precipitation of the semiconductor substance onto a plate-shaped carrier, which comprises orienting and placing a seed crystal on a plate-shaped carrier, the orientation of said seed crystal being such that the rate of growth in the direction of length is in the (112) plane and the growth in the direction of width is in the (111) plane, dissociating a gaseous semiconducting compound in a narrow zone on said carrier thereby precipitating a semiconducting layer on said carrier in said narrow zone, maintaining a temperature gradient which extends at an angle at which the rate of growth is fastest at the surface of the semiconductor layer, and passing said zone along said carrier starting from said seed.

3. A method for producing monocrystalline, particularly thin, semiconducting layers by thermal decomposition of a gaseous compound of the semiconductor substance and precipitation of the semiconductor substance onto a plate-shaped carrier, which comprises orienting and placing a seed crystal on a plate-shaped carrier, said seed crystal being small in comparison to the surface area of the carrier on which said seed crystal is located and so oriented that the rate of growth in the direction of length is in the (112) plane and the growth in the direction of width is in the (111) plane, dissociating a gaseous semiconducting compound in a narrow zone on said carrier thereby precipitating a semiconducting layer on said carrier in said narrow zone, maintaining a temperature gradient which extends at an angle at which the rate of growth is fastest at the surface of the semiconductor layer, and passing said zone along said carrier starting from said seed.

4. A method for producing monocrystalline, particularly thin, semiconducting layers by thermal decomposition of a gaseous compound of the semiconductor substance and precipitation of the semiconductor substance onto a plate-shaped carrier, which comprises orienting and placing a seed crystal on a plate-shaped carrier having a lattice structure differing from the semiconductor material to be deposited thereon, the orientation of said seed crystal being such that the rate of growth in the direction of length is in the (112) plane and the growth in the direction of width is in the (111) plane, dissociating a gaseous semiconducting compound in a narrow zone on said carrier thereby precipitating a semiconducting layer on said carrier in said narrow zone, maintaining a temperature gradient which extends at an angle at which the rate of growth is fastest at the surface of the semiconductor layer, and passing said zone along said carrier starting from said seed.

5. A method for producing monocrystalline, particularly thin, semiconducting layers by thermal decomposition of a gaseous compound of the semiconductor substance and precipitation of the semiconductor substance onto a plate-shaped quartz carrier, which comprises orienting and placing a seed crystal on a plate-shaped quartz carrier, the orientation of said seed crystal being such that the rate of growth in the direction of length is in the (112) plane and the growth in the direction of width is in the (111) plane, dissociating a gaseous semiconducting compound in a narrow zone on said carrier thereby precipitating a semiconducting layer on said carrier in said narrow zone, and passing said zone along said quartz carrier starting from said seed.

6. A method for producing monocrystalline, particularly thin, semiconducting layers by thermal decomposition of a gaseous compound of the semiconductor substance and precipitation of the semiconductor substance onto a plate-shaped ceramic carrier, which comprises orienting and placing a seed crystal on a plate-shaped ceramic carrier, the orientation of said seed crystal being such that the rate of growth in the direction of length is in the (112) plane and the growth in the direction of width is in the (111) plane, dissociating a gaseous semiconducting compound in a narrow zone on said carrier thereby precipitating a semiconducting layer on said carrier in said narrow zone, and passing said zone along said ceramic carrier starting from said seed.

7. A method for producing monocrystalline, particularly thin, semiconducting layers by thermal decomposition of a gaseous compound of the semiconductor substance and precipitation of the semiconductor substance onto a plate-shaped metal carrier, which comprises orienting and placing a seed crystal on a plate-shaped metal carrier, the orientation of said seed crystal being such that the rate of growth in the direction of length is in the (112) plane and the growth in the direction of width is in the (111) plane, dissociating a gaseous semiconducting compound in a narrow zone on said carrier thereby precipitating a semiconducting layer on said carrier in said narrow zone, and passing said zone along said metal carrier starting from said seed.

8. A method for producing monocrystalline, particularly thin, semiconducting layers by thermal decomposition of a gaseous compound of the semiconductor substance and precipitation of the semiconductor substance onto a plate-shaped carrier, which comprises orienting and placing a seed crystal on a plate-shaped carrier, the orientation of said seed crystal being such that the rate of growth in the direction of length is in the (112) plane and the growth in the direction of width is in the (111) plane, introducing a gaseous compound of the semiconductor to be deposited, through a narrow opening, against the surface of said carrier, said gaseous compound dissociating and depositing a layer of said semiconductor in a narrow zone on said carrier, and moving said narrow zone along said carrier starting from said seed crystal.

9. A method for producing monocrystalline, particularly thin, semiconducting layers by thermal decomposition of a gaseous compound of the semiconductor substance and precipitation of the semiconductor substance onto a plate-shaped carrier, which comprises orienting and placing a seed crystal on a plate-shaped carrier, the orientation of said seed crystal being such that the rate of growth in the direction of length is in the (112) plane and the growth in the direction of width is in the (111) plane, introducing a gaseous compound of the semiconductor to be deposited, through a narrow opening, against the surface of said carrier, said gaseous compound dissociating and depositing a layer of said semiconductor on said carrier in a narrow zone heated to reaction temperature, and moving said narrow zone along said carrier starting from said seed crystal.

10. A method for producing monocrystalline, particularly thin, semiconducting layers by thermal decomposition of a gaseous compound of the semiconductor substance and precipitation of the semiconductor substance onto a plate-shaped longitudinally-slitted carrier, which comprises orienting and placing a seed crystal on a plate-shaped longitudinally slitted carrier, the orientation of said seed crystal being such that the rate of growth in the direction of length is in the (112) plane and the growth in the direction of width is in the (111) plane, introducing a gaseous compound of the semiconductor to be deposited, through a narrow opening, against the surface of said carrier, said gaseous compound dissociating and depositing a layer of said semiconductor on said carrier in a narrow zone, and moving said narrow zone along said carrier starting from said seed crystal.

11. A method for producing monocrystalline, particularly thin, semiconducting layers by thermal decomposition of a gaseous compound of the semiconductor substance and precipitation of the semiconductor substance onto a plate-shaped carrier, which comprises orienting and placing a seed crystal on a plate-shaped carrier, the orientation of said seed crystal being such that the rate of growth in the direction of length is in the (112) plane and the growth in the direction of width is in the (111) plane, introducing a gaseous compound of the semiconductor to be deposited, through a narrow opening, against the surface of said carrier, said carrier issuing hydrogen at reaction temperature, said gaseous compound dissociating and depositing a layer of said semiconductor on said carrier in a narrow zone heated to reaction temperature, and moving said narrow zone along said carrier starting from said seed crystal.

12. A method for producing monocrystalline, particularly thin, semiconducting layers by thermal decomposition of a gaseous compound of the semiconductor substance and precipitation of the semiconductor substance onto a plate-shaped carrier, which comprises orienting and placing a seed crystal on a plate-shaped carrier, said seed crystal being such that the rate of growth in the direction of length is in the (112) plane and the growth in the direction of width is in the (111) plane, introducing a gaseous compound of the semiconductor to be deposited, through a narrow opening, against the surface of said carrier, said carrier being of hydrated tantalum and issuing hydrogen at reaction temperature, said gaseous compound dissociating and depositing a layer of said semiconductor on said carrier in a narrow zone heated to reaction temperature, and moving said narrow zone along said carrier starting from said seed crystal.

13. A method for producing monocrystalline, particularly thin, semiconducting layers by thermal decomposition of a gaseous compound of the semiconductor substance and precipitation of the semiconductor substance onto a plate-shaped carrier, which comprises orienting and placing a seed crystal on a plate-shaped carrier, the orientation of said seed crystal being such that the rate of growth in the direction of length is in the (112) plane and the growth in the direction of width is in the (111) plane, introducing a reaction mixture of a doping substance and of a gaseous compound of the semiconducting compound to be deposited, through a narrow opening, against the surface of said carrier to precipitate a doped semiconductor layer on said carrier in a narrow zone, and moving said narrow zone along said carrier starting from said seed crystal.

14. A method for producing monocrystalline, particularly thin, semiconducting layers by thermal decomposition of a gaseous compound of the semiconductor substance and precipitation of the semiconductor substance onto a plate-shaped carrier, which comprises orienting and placing a seed crystal on a plate-shaped carrier, the orientation of said seed crystal being such that the rate of growth in the direction of length is in the (112) plane and the growth in the direction of width is in the (111) plane, introducing a gaseous compound of the semiconductor to be deposited, through a narrow opening, against the surface of said carrier, said gaseous compound dissociating and precipitating a semiconducting layer in a narrow zone of said carrier and the concomitant doping of said semiconducting layer by doping substance diffusing from said doped carrier to said semiconducting layer during said precipitation.

15. A method for producing monocrystalline, particularly thin, semiconducting layers by thermal decomposition of a gaseous compound of the semiconductor substance and precipitation of the semiconductor substance onto a plate-shaped carrier, which comprises orienting and placing a seed crystal on a plate-shaped carrier, the orientation of said seed crystal being such that the rate of growth in the direction of length is in the (112) plane and the growth in the direction of width is in the (111) plane, introducing a reaction mixture of a doping substance and of a gaseous compound of the semiconducting compound to be deposited, through one of a series of narrow openings, against the surface of said carrier to precipitate a doped semiconductor layer in a narrow zone of said carrier, and moving said narrow zone along said carrier starting from said seed crystal.

16. A method for producing monocrystalline, particularly thin, semiconducting layers by thermal decomposition of a gaseous compound of the semiconductor substance and precipitation of the semiconductor substance onto a plate-shaped carrier, which comprises orienting and placing a seed crystal on a plate-shaped carrier, the orientation of said seed crystal being such that the rate of growth in the direction of length is in the (112) plane and the growth in the direction of width is in the (111) plane, introducing a reaction mixture of a first doping substance and of a gaseous compound of the semiconducting compound to be deposited through a first narrow opening, introducing a reaction mixture of a second doping substance and of a gaseous compound to be deposited through a second narrow opening, said second doping substance being of different type than said second doping substance, against the surface of said carrier to sequentially precipitate horizontal layers of different type on said carrier in respective narrow zones, and moving said narrow zones along said carrier starting from said seed crystal.

References Cited by the Examiner

UNITED STATES PATENTS

| | | | |
|---|---|---|---|
| 2,902,350 | 9/59 | Jenny et al. | 23—301 |
| 2,999,735 | 9/61 | Reuschel | 23—301 |

RICHARD D. NEVIUS, *Primary Examiner.*

MICHAEL A. BRINDISI, *Examiner.*